United States Patent [19]

Gonsalves

[11] Patent Number: 5,118,064
[45] Date of Patent: Jun. 2, 1992

[54] ANTI-SPATTER CONTAINER MOUNTING AND ACTUATING DEVICE

[76] Inventor: Joseph C. Gonsalves, 99 West St., North Attleboro, Mass. 02760

[21] Appl. No.: 667,629

[22] Filed: Mar. 11, 1991

[51] Int. Cl.⁵ ............................................. A47K 1/08
[52] U.S. Cl. .................................. 248/313; 248/154; 248/315
[58] Field of Search ............... 248/313, 314, 315, 310, 248/309.1, 154; 169/88, 21, 40

[56] References Cited

U.S. PATENT DOCUMENTS

| | | | |
|---|---|---|---|
| 2,499,672 | 3/1950 | Nurkiewicz | 248/313 |
| 2,531,123 | 11/1950 | Guise et al. | 169/88 X |
| 3,194,529 | 7/1965 | Brock | 248/313 |
| 3,201,075 | 8/1965 | Sievers | 248/313 X |
| 3,224,644 | 12/1965 | Davis | 248/313 X |
| 4,848,714 | 7/1989 | Ziaylek, Jr. et al. | 248/313 |
| 4,905,950 | 3/1990 | Turner et al. | 248/313 |

*Primary Examiner*—Ramon O. Ramirez
*Attorney, Agent, or Firm*—John A. Haug

[57] ABSTRACT

A mounting device is shown which is adapted to receive a spray container containing anti-spatter formulation in which a guide/actuator is adapted to receive a welding gun nozzle or the like to both position the nozzle in optimum orientation to receive anti-spatter spray from the container as well as initiate the spray.

11 Claims, 3 Drawing Sheets

ANTI-SPATTER CONTAINER MOUNTING AND ACTUATING DEVICE

BACKGROUND OF THE INVENTION

This invention relates generally to welding accessories and more specifically to a device for applying anti-spatter spray to a MIG type welding gun or the like.

In carrying out MIG welding it is conventional to periodically apply anti-spatter compound or formulation to the cone of a MIG welding gun to prevent build up of spatter thereon. This has been accomplished, for example, by inserting the cone into a container of anti-spatter paste compound. However, this tends to be messy and wasteful of the material. Another common practice is to take a spray container and direct spray of anti-spatter formulation onto the cone. The latter method is very effective in preventing build up of spatter however it entails the removal of at least one of the operator's gloves which are heavy and cumbersome as well as presenting the problem of frequently not being able to readily locate the spray container with concomitant loss of time.

SUMMARY OF THE INVENTION

It is an object of the present invention to provide a device which conveniently and accurately applies anti-spatter formulation to the cone of a MIG welding gun with minimal disruption of the welding operator's activity. Another object is the provision of an economical, yet reliable, device for accurately applying anti-spatter formulation to a MIG welding gun electrode.

Various additional objects and advantages of the present invention will become readily apparent from the detailed description and accompanying drawings.

Briefly, in accordance with the invention, a support is provided to receive and retain thereon an anti-spatter spray container in a selected position. A lever member is pivotably mounted on an upstanding elongated member and extends over the actuator of the container. A combination guide and actuator element is mounted on the free distal end of the lever for reception of the cone of a MIG welding gun or the like so that the cone of the welding gun is placed in the guide and the gun can then be forced downwardly to bring a surface of the lever into engagement with the actuator button of the spray container to thereby release spray toward the guide and concomitantly engulf the cone in anti-spatter spray. According to a feature of the invention the guide/actuator element is in the form of a generally cylindrical tube which readily accepts a cone inserted therein in a preselected location relative to the container nozzle. In another embodiment the cylindrical portion is flared at its entrance to facilitate guiding of a gun cone therein. According to another feature of the invention the surface adapted to engage the actuator button of the container is vertically adjustable to ensure optimum alignment of the guide with the container nozzle at the moment of actuation which may vary from container to container.

Brief Description of the Drawings

In the accompanying drawings in which several of the preferred embodiments of the invention are illustrated.

Figure 1:
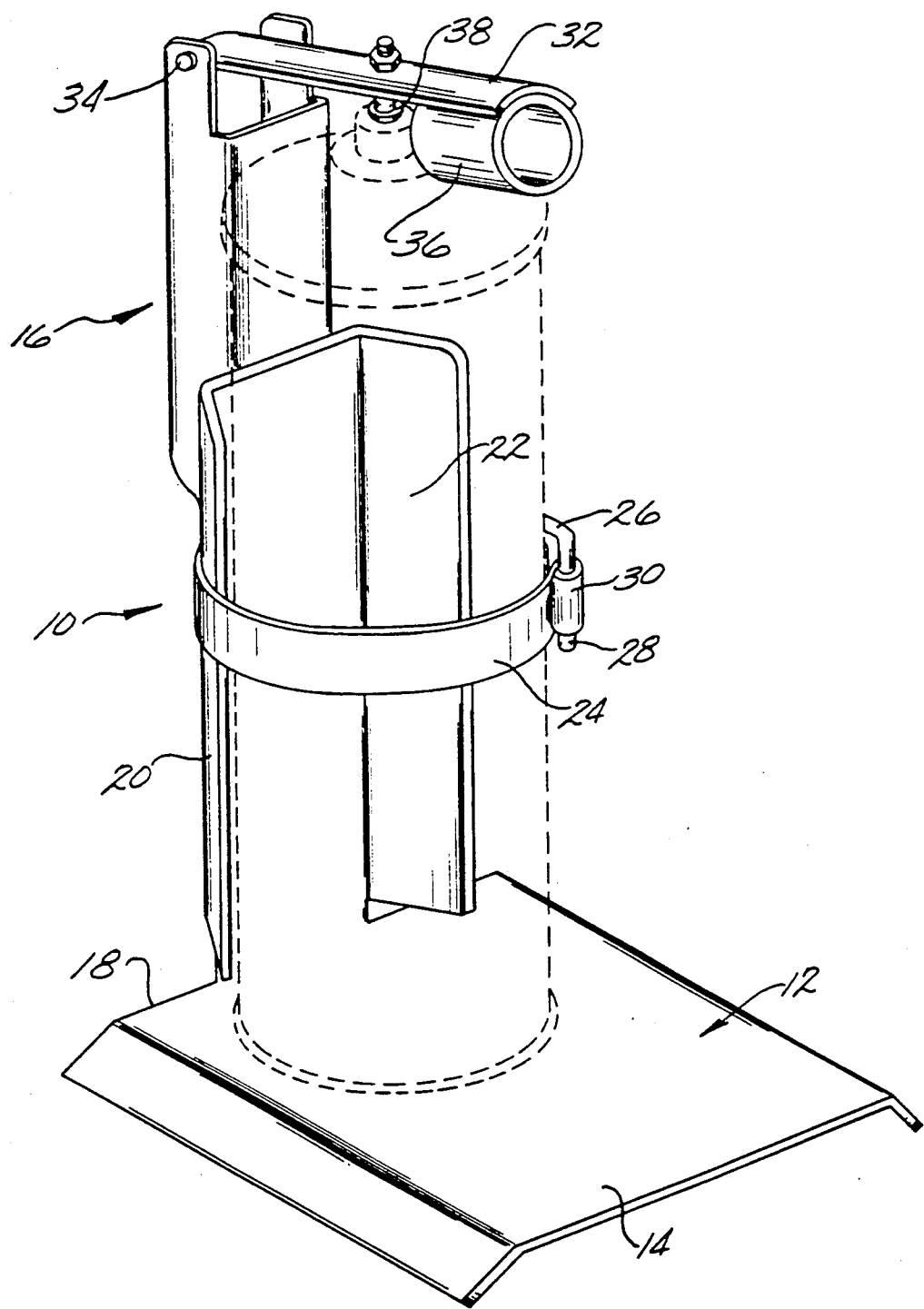
FIG. 1 is a perspective view of the device with a spray container shown in dashed lines.

Dimensions of certain parts are shown in the drawings may have been modified of exaggerated for the purpose of clarity of illustration.

Detailed Description of Preferred Embodiments

The mounting and actuating device 10 made in accordance with the invention comprises a base 12 having a suitable container receiving surface such as a generally flat top surface 14 adapted to support a spray container theron. An elongated member 16 is attached to and extends upwardly from the back portion 18 of base 12. Suitable spray container nesting means, such as plates 20, 22 extend along at least a portion of the length of member 16 and project generally toward the front of base 14 and are preferably flared outwardly to nest a spray container in a selected location on the base. A suitable retaining mechanism such as strap portions 24, 26 are connected to member 16 and are adapted to lock together by suitable means such as end portion 28 received in loop 30.

Figure 5:
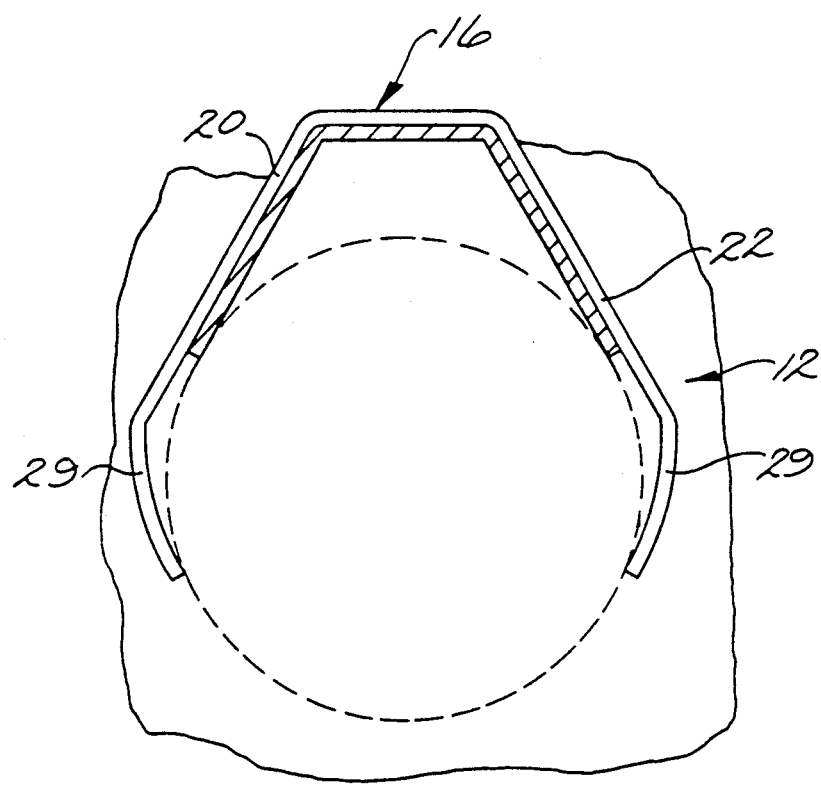
FIG. 5 is a cross section taken through the device parallel to the top surface of the base showing an alternative retaining mechanism for retaining the spray container.

Alternatively, as shown in FIG. 5, a spring biasing member could be used to retain a spray container in its nested position such as generally U-shaped steel clip 29 attached to member 16 having opposed arms adapted to receive a container (shown in dashed lines).

Lever element 32 is pivotably connected to the free distal portion of member 16 at 34 and extends over the base towards the front thereof and culminates in a generally cylindrical tubular portion 36 which serves as a guide/actuator element. The inner diameter of the tubular portion is chosen to be in the range from approximately 9/16 of an inch to approximately 15/16 of an inch to accomodate conventional MIG gun nozzles or cones.

Figure 3:
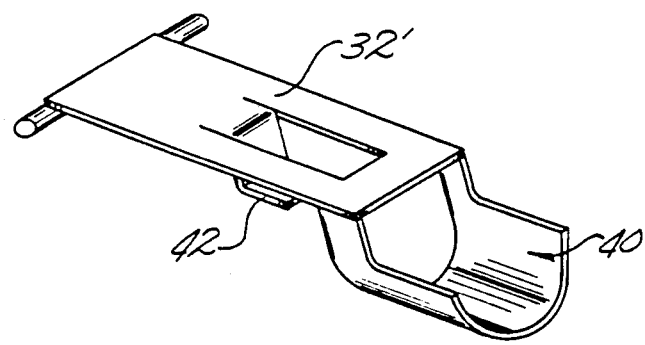
FIGS. 2-4 are partial perspective views of alternate guide/actuator lever elements usable with the invention.

Intermediate the ends of lever element 32 a cam member 38 depends therefrom and is positioned so that it is in vertical alignment with the depressable button on the top of the spray container which is received and locked on the base. As shown in FIG. 1 cam 38 takes the form of a bolt which is vertically adjustable to provide optimum vertical placement of the cam surface and concomitantly the tubular portion relative to the spray container nozzle so that at the actuated position of the button the longitudinal axis of the tubular portion passes through the spray container nozzle. It will be appreciated that the cam surface could also be formed from a tab 42 struck from lever 32 which could then be bent into the selected vertical position as shown in FIG. 3. Further, if desired the cam surface could be a fixed surface in a preselected location relative to the tubular portion.

In operation the welder, from time to time, merely inserts the open end of the cone of the MIG welding gun into the tubular portion and the welder then presses down with the welding gun which depresses the spray container actuator button causing release of the anti-spatter spray into the tubular portion which holds the captive nozzle. Since the tubular portion is in line with the spray container nozzle and only approximately a half inch away the cone is consistently sprayed in an accurate and effective manner.

Figure 2:
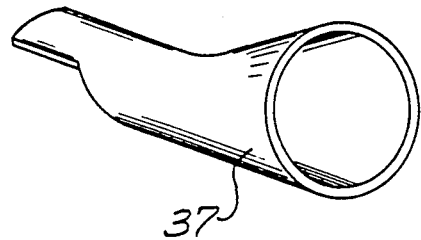

As seen in FIG. 2, tubular portion 36 can be, if desired, provided with a flared portion 37 at its entrance to facilitate placement of the welding gun tip therein.

Figure 4:
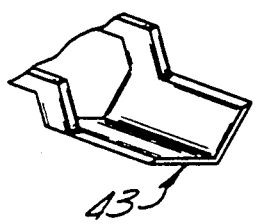

Although tubular portion 36 is preferred because it provides positive positioning of the MIG gun cone in the desired position relative to the nozzle of the spray container it will be realized that other guide/actuator members could be employed such as an open tubular portion or trough 40 shown in FIG. 3 which also shows tab portion 42 struck from the body of lever 32' as described above. Although portion 40 is shown to be a portion of a cylinder it could also be generally V-shaped as shown at 43 in FIG. 4, and still effectively guide a cone to the selected position as well as permit transmission of a downward force to actuate the spray container.

Figure 6:
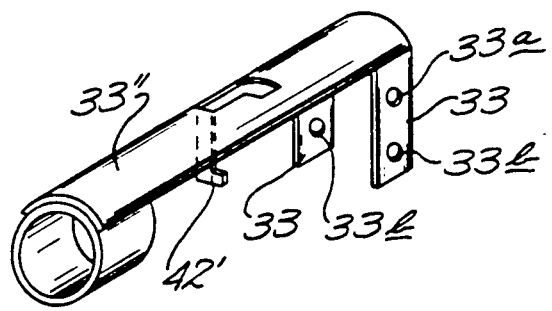
FIG. 6 is a perspective view of an alternative guide/actuator element.

In order to accommodate both 16 ounce and 24 ounce spray containers the guide/actuator element can be formed as shown in FIG. 6 with a pair of legs 33 depending from an end thereof. Two pair of vertically spaced pivot holes 33a and 33b are formed in respective legs 33 to allow vertical adjustment of guide/actuator element 32" relative to elongated member with suitable pins inserted through top distal end portion of member 16. It will be obvious that other vertically spaced pivot holes can be provided in legs 33 to accommodate spray containers of other sizes.

In operation, with the mounting and actuating device of the invention an operator is able to accurately direct anti-spatter spray to a welding gun cone using only one hand and without removal of his glove and with minimal loss of time and loss of anti-spatter material.

Although this invention has been described with respect to certain specific embodiments thereof, many other variations and modifications will immediately become apparent to those skilled in the art. It is therefore the intention that the appended claims be interpreted as broadly as possible in view of the prior art to include all such variations and modifications.

I claim:

1. A mounting and actuating device for anti-spatter spray containers comprising a base adapted to support a spray container, an elongated member extending upwardly from the base and having a free distal end portion, a guide/actuator lever element pivotably attached to the distal end portion extending over the base, the guide/actuator lever element having a free distal portion configured to receive a portion of a member on which it is desired to spray anti-spatter formulation and to transmit a force from the portion of a member to the actuator of a spray container mounted on the base in a selected direction onto the portion of a member and means to lock a spray container in a selected location on the base.

2. A mounting and actuating device according to claim 1 in which the free distal end portion of the lever element is generally U-shaped having a bight for transferring force to a spray container actuator and upstanding wall portions to guide a welding gun cone into a preselected aligned position.

3. A mounting and actuating device according to claim 1 in which the free distal end portion of the lever element is generally tubular for both guiding a welding gun cone into a preselected aligned position and for transmitting a force to a spray container actuator.

4. A mounting and actuating device according to claim 1 in which the free distal end portion of the lever element is generally V-shaped having upstanding walls for transferring force to a spray container actuator and for guiding a welding gun cone into a preselected aligned position.

5. A mounting and actuating device according to claim 1 in which a force transmitting surface depends downwardly from the actuator/guide lever element intermediate its ends.

6. A mounting and actuating device according to claim 3 in which the tubular distal end portion of the lever element is generally cylindrical having an inside diameter in the range from approximately 9/16 inch to approximately 15/16 inch.

7. A mounting and actuating device according to claim 1 further including spray container retaining means connected to the elongated member and adapted to retain the container in a selected position on the base.

8. A mounting and actuating device according to claim 7 in which the retaining means comprises a strap member.

9. A mounting and actuating device according to claim 7 in which the retaining means comprises a generally U-shaped spring clip.

10. A mounting and actuating device for anti-spatter spray containers comprising a base adapted to support a spray container, an elongated member extending upwardly from the base and having a free distal end portion, a guide/actuator lever element pivotably attached to the distal end portion extending over the base, the guide/actuator lever element having a free distal portion configured to receive a portion of a member on which it is desired to spray anti-spatter formulation and to transmit a force from the portion of a member to the actuator of a spray container mounted on the base in a selected direction onto the portion of a member, a force transmitting surface depending downwardly from the actuator/guide lever element intermediate its ends, the position of the force transmitting surface relative to the actuator/guide lever element being adjustable, and means to lock a spray container in a selected location on the base.

11. A mounting and actuating device for anti-spatter spray containers comprising a base adapted to support a spray container, an elongated member extending upwardly from the base and having a free distal end portion, a guide/actuator lever element pivotably attached to the distal end portion extending over the base, the guide/actuator lever element having a free distal portion configured to receive a portion of a member on which it is desired to spray anti-spatter formulation and to transmit a force from the portion of a member to the actuator of a spray container mounted on the base in a selected direction onto the portion of a member, the vertical position of the guide/actuator lever element relative to the base being adjustable, and means to lock a spray container in a selected location on the base.

* * * * *